United States Patent Office 2,778,691
Patented Jan. 22, 1957

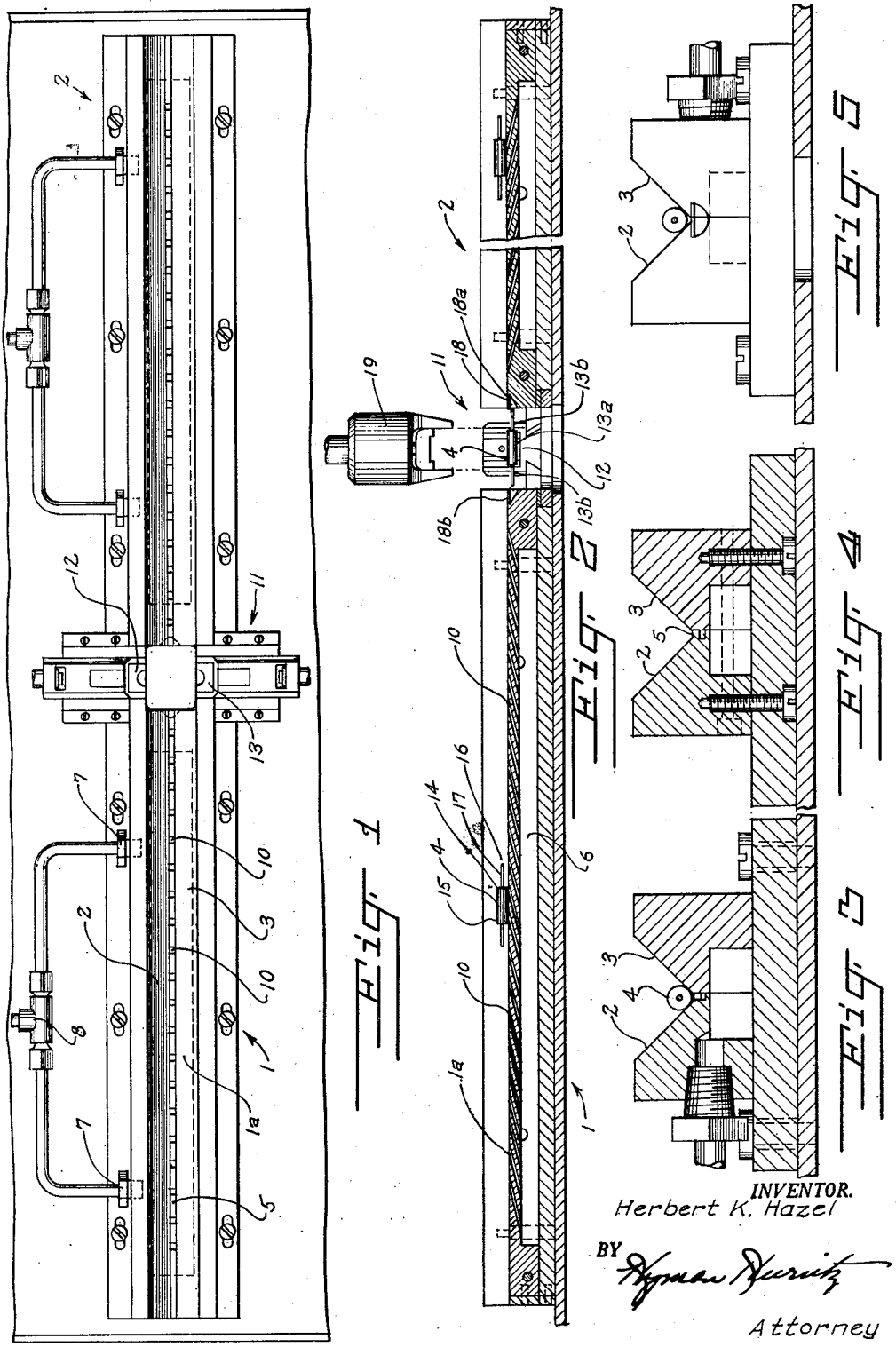

2,778,691

STAPLING MACHINES

Herbert K. Hazel, Arlington, Va., assignor to Melpar, Inc., Alexandria, Va., a corporation of New York Application June 7, 1955, Serial No. 513,782

2 Claims. (Cl. 302—2)

The present application is a division of an application for Letters Patent of the United States, filed March 10, 1955, in the names of Bernd Vossen and Herbert K. Hazel, Serial No. 493,392 and entitled Stapling Machines.

The present invention relates generally to pneumatically operated component conveyors and positioning devices, and more particularly to systems for feeding components of various sizes, which originate at any one of a number of supply points, to a delivery station, and for automatically positioning the components suitably for further operations at the delivery station.

Briefly describing the present invention, an elongated stationary upwardly open chute of generally V-shaped cross-section is employed as a conveyor, to guide components from component delivery stations to a final delivery station at which operations may be performed on the components. The components are generally of the type utilized in fabrication of electronic circuits, and may each comprise a body (which may be cylindrical) and two axial collinear thin metallic leads extending in opposite directions from the body; however, the body may be other than cylindrical shape, and more specifically, may be of rectangular cross section. The components may be various sizes and weights, and may be delivered to the chute at random times, and at random points along the chute. The chute conveyor contains a number of air passageways, terminating along its vertex, and distributed along the chute at short intervals. These are supplied with air under pressure. The passageways make an angle of about twenty degrees with the longitudinal dimension of the chute, and are so arranged that air under pressure emerging from the passageways blows the components along the chute toward a delivery point, and simultaneously applies force vertically upwardly against the components, tending to raise them. The specific angle which the passageways make with the chute and the air pressure utilized are selected in accordance with the average weight and size of the components to be conveyed and the frictional forces which are to be overcome as the components move along the chute. The separation longitudinally of the terminations of the air passageways may be so selected as to be less than the minimum length of component is at all times acted upon by at least one jet of air, deriving from one of the outlets, regardless of its instantaneous position along the chute.

At the delivery station is located a stapling device, which forms the components leads as staples, in accordance with one specific embodiment of the present invention. However, other types of operations may be contemplated at the delivery station, it being a primary object of the present invention to deliver the components to a delivery point, and there to position the components automatically in readiness for some further operation, whatever the nature of that operation may be.

The fact that a V-shaped open chute is utilized to convey the components to the delivery station, and the fact that the components are actuated by air jets, implies that the components will be actuated along the length of the chute in a direction parallel to the axis of the component, and more particularly in a direction parallel with the axially directed leads. In order to accomplish the component positioning operation in a suitable receptacle at the termination of the delivery chute, it is requisite that the distance between lead ends of each component be of predetermined extent.

At the delivery station the forward end of each component is cammed upwardly in response to the inertia or kinetic energy of the component so that it falls horizontally into a receptacle formed by a pair of separable staple forming blocks, assuming that a stapling operation is to be accomplished at the delivery station, where the leads of the components may be bent over the forming blocks to form staple elements. If the system is to be utilized to perform other than stapling operations at the delivery station, however, other types of receptacles for the components may be employed. Nevertheless, the camming operation is requisite to proper and certain positioning of the components at the delivery station, since once the components leave the chute the forward ends of the components tend to drop while the rearward portions of the components are still supported by the chute.

In accordance with the invention the forward lead of the component is directed with sufficient force as it leaves the chute at the delivery station, that the forward lead of the component drops but a short distance in the time required for the component to straddle the delivery station. When the component has partially straddled the delivery station, but before the rearward lead has left the chute, the forward tip of the forward lead arrives at a camming surface, which prevents further dropping of that end of the component. Moreover, the inertia of the component forces the tip of the lead upwardly along the camming surface, raising the forward end of the component into parallelism with the rearward end. A stop is located at the termination of the cam, so that the tip of the lead, on striking the stop, terminates its motion. The component body then drops into a receptacle, and is appropriately positioned at the delivery station.

It is, accordingly, a primary object of the present invention to provide an automatic device for conveying components of various sizes and weights to a delivery station, and for positioning the components suitably at the positioning station, regardless of the weights and sizes of the components and regardless of the positions along the chute of the conveying mechanism at which the components were originally delivered.

It is a further object of the present invention to provide a system for positioning components of random size and weight in a desired position at a delivery station by utilizing the inertia of the components to cam the components into the desired position.

It is another object of the invention to provide a conveyor for components of a variety of sizes and weights, in the form of an open chute of V-shaped cross section having pneumatic jets at its vertex, these jets being so directed as to tend to raise the components while directing them in a desired direction.

The above and still further features, objects, and advantages of the present invention will become apparent upon consideration of the following detailed description of a specific embodiment of the invention, especially when taken in conjunction with the accompanying drawings, wherein:

Figure 1 is a view in plan of a conveyor system in accordance with the present invention, and of a specific type of delivery station which may be employed in conjunction with the delivery chute;

Figure 2 is a view in longitudinal cross section taken on the line 2—2 of Figure 1;

Figure 3 is a view in transverse cross section taken on the line 3—3 of Figure 1;

Figure 4 is a further view in transverse cross section taken on the line 4—4 of Figure 1; and Figure 5 is an end view in elevation of the system of Figure 1.

Referring now more particularly to the accompanying drawings, the reference numeral 1 denotes generally an open channel of V-shaped cross section, and the apex of the V directed vertically downwardly. The reference numeral 2 denotes a second identical channel. The channels 1 and 2 feed electrical components in opposite directions, respectively, to a common forming and stapling station 3, where they may be formed as staples, and thereafter secured staple-wise to an insulating wafer. The latter portion of the operation forms no part of this invention and is described and illustrated in the above-identified patent application.

Describing one of the conveyors, 1, as typical, the V-shaped channel 1a includes sloping sides 2, 3, making an angle of approximately 90°, one to the other, the specific angle being unimportant, and selected primarily for convenience, provided, however, that a component 4 may lie snugly in the vertex of the channel. The junction of the sloping sides is not sharp, but is truncated slightly, to form a flat at 5. Located under the open channel 1 is a further closed channel 6, which communicates with inlet fittings 7, in turn coupled to suitable pneumatic piping 8, which supplies air under pressure to the channel 6 from a suitable source of compressed air. The channel 6 communicates with the V-shaped channel 1a via a large number of spaced openings 10, which extend into the base of the V-channel 1a at a relatively small angle, say 20°, for example, sloping upwardly toward a forming and stapling station 11, which constitutes a delivery station for the conveyor 1. The openings 10 are relatively elongated and of small cross section, so that directioned jets of air are supplied to the base 5 of the channel, at a large number of points along the length thereof.

The net effect of the jets of air emerging from the apertures 10 is to tend to lift the component 4, and thus to reduce frictional forces generated by its motion along the chute 1a, and simultaneously to apply force to component 4 tending to slide the latter toward the delivery station 11. The apertures 10 are distributed along the entire length of the conveyor 1, and are sufficiently closely spaced in relation to the length of the conveyed component 4 that the component 4 is subject to sliding and lifting force in response to an air jet from at least one of the apertures 10, regardless of its momentary position along the conveyor 1.

The angle which the apertures 10 make with the base 5 of the conveyor channel 1a has been found to have an optimum, which is relatively critical, and which depends on the size of the apertures 10, on the size and weight and configuration of the components 4, on the air pressure utilized, and on the number of openings per inch of conveyor. The proper combination may be readily found empirically. This optimum value, for which motion of the component 4 is rapid, smooth, and linear, were determined empirically by applicant, and has been found to be about 20° in one practical embodiment of the present invention.

When a component 4 has arrived at the delivery end of the conveyor 1, the component is impelled by its inertia or kinetic energy to cross the space between the conveyors 1, 2, between which lies the delivery station 11. In the presently described embodiment of the invention, the delivery station comprises forming blocks 12, 13, having a receptacle 13a for the body of component 4. As the forward end 14 of the component leaves the conveyor chute 1a, it begins to drop, while the rearward end 15 remains supported. However, the motion of the component 4 along the chute is sufficiently rapid that the forward end 16 of the forward lead 17 of the component 4 reaches a camming surface 18, while the rearward end 15 is still supported and before the forward end has dropped appreciably. Continued forward motion of the component 4 results then in camming upward of the forward end 14 of the component 4. The camming surface 18 is so designed, in relation to the level of the forming blocks 12, 13, as to permit the forward end of the component to pass over edges 13b of the forming blocks 12, 13, and the body to be supported over the receptacle thereof, after the component 4 has left the conveyor. A stop surface 18a is provided at the termination of the camming surface. The rearward end of the component then also drops, and the component body lies accurately positioned in the receptacle 13a of the forming blocks 12, 13, the leads resting on the receptacle edges 13b ready for a forming operation. It is requisite to this end that the forming blocks 12, 13 be of V-shaped cross section, in alignment with the V of the chute 1a, so that the component may lie accurately in the V, and hence may be accurately positioned laterally, for subsequent operations. At the same time it is essential that the position of the component longitudinally be maintained, and that this maintenance be independent of the length of the component body. To this end, the leads of the component are accurately cut to length, in advance of feeding to the machine, so that each lead extends the same distance from the body of the component as does the other lead, i. e. so that leads and body are symmetrically, and so that the total length of the component and leads, taken from lead end to lead end, has a predetermined value. The latter length is just short, by a few thousandths of an inch, of the distance required to establish the position of the component 4 between conveyors 12, 13. The component 4 then comes into position longitudinally in the forming block receptacle 13a in preparation for a forming operation. The latter operation may be accomplished by lowering a staple forming head 19 over the forming blocks 12, 13, in a manner more specifically described in the above referred to patent application, and which does not form part of the present invention.

While I have described and illustrated one specific example of the present invention it will be clear that variations of the specific details of construction may be resorted to without departing from the true spirit of the invention as defined in the appended claims.

What I claim is:

1. A conveyor system for objects, comprising an elongated generally open horizontal chute, said chute having the transverse cross section of an upwardly open channel, a plurality of pneumatic passageways positioned in the bottom of said chute, said passageways making an acute angle with the longitudinal dimension of said chute in the desired direction of travel of one of said objects, whereby said objects are subjected to a lifting force and a propelling force simultaneously by pneumatic fluid passing through said passageways, wherein is further provided a delivery station adjacent and beyond a delivery end of said chute, said delivery station including a cam, said cam having a camming surface arranged to raise a forward portion of one of said objects in response to the kinetic energy imparted to said one of said objects by its movement along said conveyor to a level substantially the same as the level of a rearward portion of said one of said objects as said rearward portion leaves said conveyor.

2. A conveyor system for objects, comprising an elongated generally open horizontal chute, said chute having the transverse cross section of an upwardly open channel, a plurality of pneumatic passageways positioned in the bottom of said chute, said passageways making an acute angle with the longitudinal dimension of said chute in the desired direction of travel of one of said objects, whereby said objects are subjected to a lifting force and a propelling force simultaneously by pneumatic fluid passing through said passageways, wherein is further provided a delivery station adapted to support said object, said station located adjacent and beyond a delivery end of said conveyor, whereby said object is deliverable to said delivery station in response to its own kinetic energy after it leaves said conveyor, and camming means for automatically camming a forward end of said object upwardly toward a predetermined position at said delivery station in response to said kinetic energy of said object, and a stop for terminating motion of said forward end of said object at a predetermined point in space, during said camming.

References Cited in the file of this patent

UNITED STATES PATENTS

| | | |
|---|---|---|
| 662,574 | McGary | Nov. 27, 1900 |
| 2,257,683 | Haywood | Sept. 30, 1941 |